US007580021B2

(12) United States Patent
Morita

(10) Patent No.: US 7,580,021 B2
(45) Date of Patent: Aug. 25, 2009

(54) DISPLAY DRIVER CONVERTING KI BITS GRAY-SCALE DATA TO CONVERTED GRAY-SCALE DATA OF J BITS, ELECTRO-OPTICAL DEVICE AND GAMMA CORRECTION METHOD

(75) Inventor: Akira Morita, Suwa (JP)

(73) Assignee: Seiko Epson Corporation (JP)

( * ) Notice: Subject to any disclaimer, the term of this patent is extended or adjusted under 35 U.S.C. 154(b) by 648 days.

(21) Appl. No.: 11/244,803

(22) Filed: Oct. 6, 2005

(65) Prior Publication Data
US 2006/0077491 A1    Apr. 13, 2006

(30) Foreign Application Priority Data
Oct. 8, 2004   (JP)   ............... 2004-296131

(51) Int. Cl.
*G09G 3/36* (2006.01)
(52) U.S. Cl. .......................................... 345/88; 345/89
(58) Field of Classification Search .................. 345/88, 345/89, 98, 690
See application file for complete search history.

(56) References Cited

U.S. PATENT DOCUMENTS

| 6,215,468 | B1 * | 4/2001 | Van Mourik ................. 345/605 |
| 6,459,416 | B1 * | 10/2002 | Sasaki et al. ................... 345/89 |
| 6,977,647 | B2 * | 12/2005 | Park ............................. 345/204 |
| 2002/0145602 | A1 | 10/2002 | Matsueda | |
| 2003/0122754 | A1 * | 7/2003 | Bu .............................. 345/87 |
| 2003/0151577 | A1 | 8/2003 | Morita | |
| 2003/0151578 | A1 | 8/2003 | Morita | |
| 2003/0151616 | A1 | 8/2003 | Morita | |
| 2003/0151617 | A1 | 8/2003 | Morita | |
| 2004/0233227 | A1 * | 11/2004 | Toriumi et al. ............... 345/690 |
| 2005/0007392 | A1 * | 1/2005 | Kasai et al. .................. 345/690 |

FOREIGN PATENT DOCUMENTS

| CN | 1432988 | 7/2003 |
| JP | 04-304495 | 10/1992 |
| JP | 11-15444 | 1/1999 |
| JP | 2003-233354 | 8/2003 |
| JP | 2003-233355 | 8/2003 |
| JP | 2003-233356 | 8/2003 |
| JP | 2003-233357 | 8/2003 |

* cited by examiner

*Primary Examiner*—Amare Mengistu
*Assistant Examiner*—Vinh T Lam
(74) *Attorney, Agent, or Firm*—Harness, Dickey & Pierce, P.L.C.

(57) ABSTRACT

A data driver includes gamma correction circuits for first to p-th color components for first to p-th (p is an integer equal to or more than two) color components constituting one pixel, a gamma correction circuit for an i-th ($1 \leq i \leq p$, i is an integer) color component converting ki-bit (k1 to kp are integers) gray-scale data to converted gray-scale data of j (j>ki, j is an integer equal to or more than two) bits; a voltage selection circuit which outputs a data voltage corresponding to the converted gray-scale data of each color component among reference voltages of $2^j$ types; and a driving circuit which drives the data lines based on a data voltage of each color component. The gamma correction circuit for an i-th color component generates the converted gray-scale data of j bits so that one of the reference voltages of $2^j$ types to which ki bit gray-scale data becomes allocated is the data voltage.

11 Claims, 13 Drawing Sheets

| REFERENCE VOLTAGE | GRAY-SCALE DATA (6 BITS) | | CONVERTED GRAY-SCALE DATA (8 BITS) |
|---|---|---|---|
| V255 | 111111 | → | 11111111 |
| V254 | — | | — |
| V253 | — | | — |
| ⋮ | ⋮ | | ⋮ |
| V124 | 100001 | → | 01111100 |
| V123 | — | | — |
| V122 | — | | — |
| V121 | 100000 | → | 01111001 |
| V120 | — | | — |
| V119 | — | | — |
| ⋮ | ⋮ | | ⋮ |
| V3 | 000010 | → | 00000011 |
| V2 | — | | — |
| V1 | 000001 | → | 00000001 |
| V0 | 000000 | → | 00000000 |

FIG. 7

|  | IN THE CASE OF ROM CIRCUIT | CIRCUIT IN THIS EMBODIMENT |
|---|---|---|
| ONE COLOR | 9000 $\mu$ m² | 4500 $\mu$ m² |
| THREE COLORS | 27000 $\mu$ m² | 7500 $\mu$ m² |

DISPLAY DRIVER CONVERTING KI BITS GRAY-SCALE DATA TO CONVERTED GRAY-SCALE DATA OF J BITS, ELECTRO-OPTICAL DEVICE AND GAMMA CORRECTION METHOD

Japanese Patent Application No. 2004-296131, filed on Oct. 8, 2004, is hereby incorporated by reference in its entirety.

BACKGROUND OF THE INVENTION

The present invention relates to display drivers, electro-optical devices, electronic equipment, and a gamma correction method.

Electro-optical devices represented by liquid crystal display (LCD) panels have come to be increasingly mounted on the portable electronic equipment. On the other hand, image displays rich in color tone have been demanded, as multiple gray-scale images have been generalized.

In general, the gamma correction is applied to a video signal for performing the image display according to the display properties of a display device. The gamma correction is performed by means of a gamma correction circuit. In an electro-optical device as an example, a gamma correction circuit changes the voltage level itself that corresponds to gray-scale data for determining a gray-scale value, for example, to change the driving voltage so that desired display properties can be obtained. Examples of the method for changing voltage level are disclosed in JP-A-2003-233354, JP-A-2003-233355, JP-A-2003-233356 and JP-A-2003-233357.

It is sometimes desired to perform a gamma correction that differs depending on color components, that is, the R component, G component, and B component constituting one pixel. This is because the display properties may differ depending on color component. However, a plurality of voltages with the resistance divided by a resistive circuit have been regarded as reference voltages, and a data voltage has been selected among these reference voltages. In these cases, the gamma correction has altered the voltage level by altering this resistance division ratio. Accordingly, if such a gamma correction circuit is provided for each color component, the gamma correction circuit involves a problem of increasing the circuit size as well as increasing the current spent in the resistive circuit 3 times more than otherwise.

Different gamma corrections need to be performed between the case where a displayed image of the LCD panel is seen indoors and the case where the displayed image of the LCD panel is seen in the outside light. It is therefore desirable that a manner of performing a gamma correction can be changed flexibly.

SUMMARY

A first aspect of the invention relates to a display driver for driving a plurality of data lines of an electro-optical device, the display driver comprising:

gamma correction circuits for first to p-th color components provided for first to p-th (p is an integer equal to or more than two) color components, respectively, the first to p-th color components constituting one pixel, a gamma correction circuit for an i-th ($1 \leq i \leq p$, i is an integer) color component converting ki-bit (k1 to kp are integers) gray-scale data to converted gray-scale data of j (j>ki, j is an integer equal to or more than two) bits;

a voltage selection circuit which selects a reference voltage corresponding to the converted gray-scale data of each color component among reference voltages of $2^j$ types and outputs the reference voltage as a data voltage for each color component; and a driving circuit which drives the data lines based on a data voltage of each color component for each color component;

wherein the gamma correction circuit for an i-th color component generates the converted gray-scale data of j bits so that the voltage selection circuit selects and outputs, as the data voltage, one of the reference voltages of $2^j$ types to which a gray-scale value corresponding to ki bit gray-scale data is allocated.

A second aspect of the invention relates to an electro-optical device, comprising:

a plurality of scanning lines;
a plurality of data lines;
a pixel electrode specified with one of the plurality of scanning lines and one of the plurality of data lines;
a scan driver which scans the plurality of scanning lines; and
the above display driver which drives the plurality of data lines.

A third aspect of the invention relates to electronic equipment comprising the above display driver.

A fourth aspect of the invention relates to electronic equipment comprising the above electro-optical device.

A fifth aspect of the invention relates to a gamma correction method for a display driver which drives a plurality of data lines of an electro-optical device, comprising:

converting ki-bit ($1 \leq i \leq p$, k1 to kp are integers) gray-scale data to converted gray-scale data of j (j>ki, j is an integer equal to or more than two) bits for each of first to p-th (p is an integer equal to or more than two) color components constituting one pixel;

selecting a reference voltage corresponding to the converted gray-scale data of each color component among reference voltages of $2^j$ types, and outputting the reference voltage as a data voltage;

driving first to p-th data lines based on a data voltage of each color component, wherein the converted gray-scale data is generated so as to select any one of the reference voltages of $2^j$ types to which a gray-scale value corresponding to ki bit gray-scale data is allocated and output the reference voltage as the data voltage.

BRIEF DESCRIPTION OF THE DRAWINGS

FIG. 7 is a view illustrating operations of the gamma correction circuit for the R component in FIG. 6;

DESCRIPTION OF THE EMBODIMENTS

Figure 1:
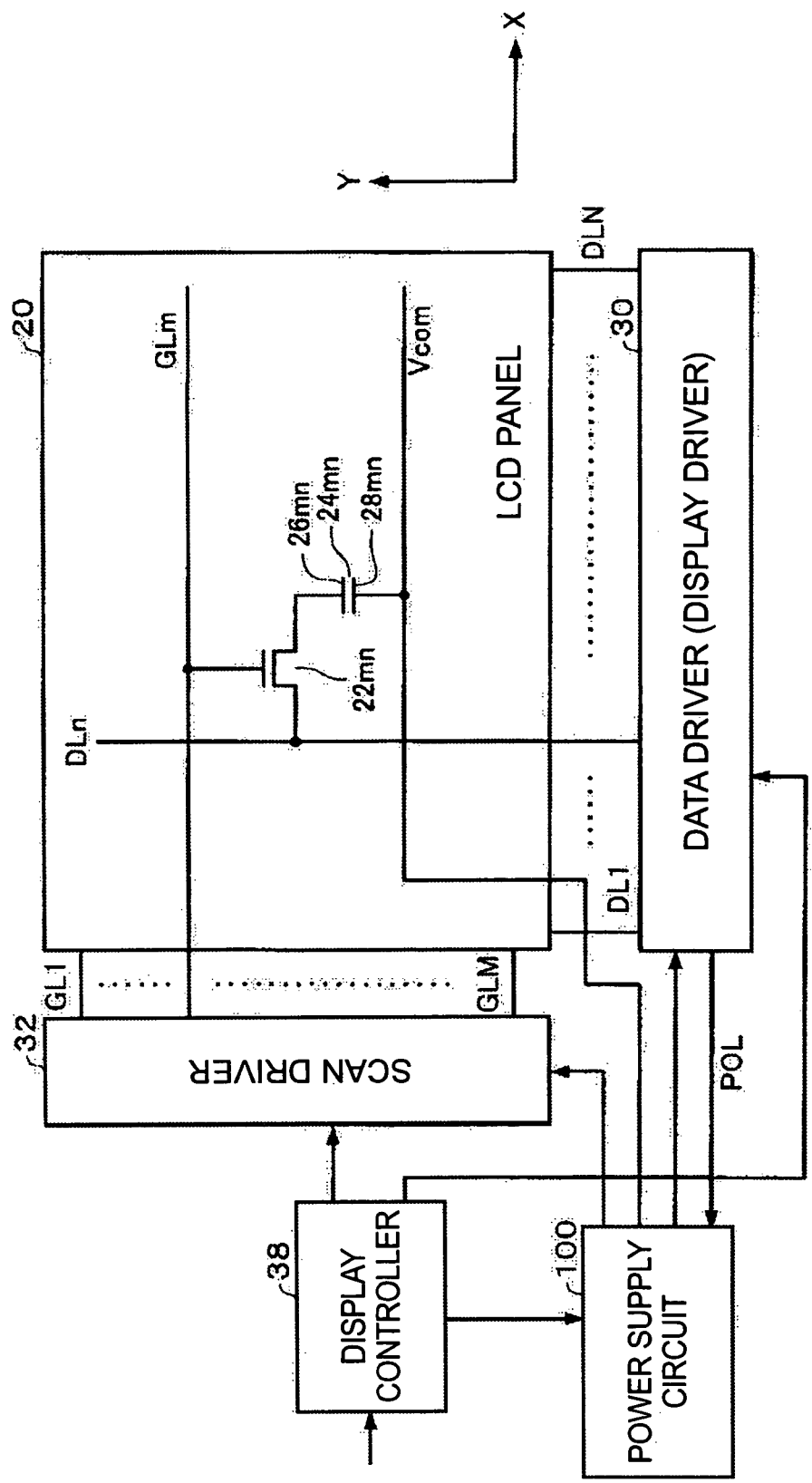
FIG. 1 is a view showing the outline of a structure of an LCD device including an electro-optical device in the present embodiment.

The invention may provide a display driver, an electro-optical device, electronic equipment and a gamma correction method that can attain various gamma corrections having low power consumption without an increase in circuit size.

An embodiment of the invention provides a display driver for driving a plurality of data lines of an electro-optical device, the display driver comprising:

gamma correction circuits for first to p-th color components provided for first to p-th (p is an integer equal to or more than two) color components, respectively, the first to p-th color components constituting one pixel, a gamma correction circuit for an i-th ($1 \leq i \leq p$, i is an integer) color component converting ki-bit (k1 to kp are integers) gray-scale data to converted gray-scale data of j (j>ki, j is an integer equal to or more than two) bits;

a voltage selection circuit which selects a reference voltage corresponding to the converted gray-scale data of each color component among reference voltages of $2^j$ types and outputs the reference voltage as a data voltage for each color component; and a driving circuit which drives the data lines based on a data voltage of each color component for each color component;

wherein the gamma correction circuit for an i-th color component generates the converted gray-scale data of j bits so that the voltage selection circuit selects and outputs, as the data voltage, one of the reference voltages of $2^j$ types to which a gray-scale value corresponding to ki bit gray-scale data is allocated.

In this embodiment, the ki bit gray-scale data of the i-th color component is converted to the j bit converted gray-scale data. Accordingly, each gray-scale value of $2^{ki}$ types represented with ki bit gray-scale data is allocated to any one of j bit converted gray-scale data. The converted gray-scale data is made corresponding to any one of reference voltages of $2^j$ types, and therefore the similar effect to the gamma correction can be obtained, as a result, according to the method of allocating ki bit gray-scale data.

Then, the gray-scale data of each color component is converted to the converted gray-scale data, and then the data voltage is generated for each color component. The driving circuit drives each data line based on the data voltage generated for each color component.

Further, in this embodiment, the method of allocating ki bit gray-scale data can be changed for each color component. Accordingly, if an electro-optical device has display properties that differ depending on color component, the use of the common reference voltage enables properties of each color component after gamma correction to be aligned or intentionally changed to desired properties for each color component. Additionally, a common reference voltage can be used, and therefore the voltage level itself of a reference voltage need not be changed by the provision of a resistive circuit for each color component. As a result, the current spent in the resistive circuit can be substantially reduced.

The display driver according to the embodiment of the invention may include a line latch which latches the converted gray-scale data of j bits for each color component, the converted gray-scale data being converted by the gamma correction circuits for first to p-th color components, and the voltage selection circuit may output the data voltage by using the converted gray-scale data latched by the line latch.

In this invention, after the gray-scale data is converted to the converted gray-scale data, the converted gray-scale data is buffered. Thus, gamma correction circuits for first to p-th color components need not be provided for each output in comparison with the case in which the gray-scale data is converted to the converted gray-scale data after buffering. Consequently, a circuit area can be substantially reduced.

In the display driver according to the invention,
the gamma correction circuit for the i-th color component may include:

a gray-scale indication register to which gray-scale indication information to indicate reference voltages of $2^{ki}$ types among the reference voltages of $2^j$ types is set;

a gray-scale data decision circuit which decides which of the reference voltages of $2^j$ types a reference voltage corresponding to the gray-scale data is, based on the gray-scale indication information; and a converted gray-scale data generation circuit which generates the converted gray-scale data based on a decision result of the gray-scale data decision circuit.

Also, in the display driver according to this embodiment,
the gray-scale indication information may be $2^j$ bit information;

the gray-scale data decision circuit may include:

a gray-scale number information generation circuit which generates converted gray-scale number information of $2^{ki}$ types based on the gray-scale indication information; and a comparison circuit which compares the gray-scale data as a gray-scale number before conversion with the converted gray-scale number information; and the converted gray-scale data generation circuit may generate the converted gray-scale data, with a comparison result of the comparison circuit as a decision result of the gray-scale data decision circuit.

In the display driver according to this embodiment,
$2^j$ bits may be divided into a plurality of blocks to each of which block data is allocated, each block having a plurality of bits;

the gray-scale data decision circuit may obtain a matching block in which the gray-scale data matches the converted gray-scale number information, and a bit position which is indicated by the gray-scale indication information in the matching block and at which the gray-scale data matches the converted gray-scale number information; and the converted gray-scale data generation circuit may generate the converted gray-scale data based on block data allocated to the matching block and bit data corresponding to the bit position.

According to this embodiment, the circuit for converting the ki bit gray-scale data of i-th color component to the j bit converted gray-scale data need not be structured as a decode circuit. Accordingly, the gamma correction in this embodiment need not be structured by so-called ROM circuit. Consequently, a display driver that implements a gamma correction, by which display properties for each color component can be flexibly altered, by means of the circuit having the size substantially reduced in comparison with the structure with the ROM circuit.

An embodiment of the invention provides an electro-optical, comprising:

a plurality of scanning lines;

a plurality of data lines;

a pixel electrode indicated with one of the plurality of scanning lines and one of the plurality of data lines;

a scan driver which scans the plurality of scanning lines; and any one of the above display drivers which drive the plurality of data lines.

According to this embodiment, there can be provided an electro-optical device including a display driver that implements various gamma corrections having low power consumption without increasing the circuit size to improve the image quality.

An embodiment of the invention provides electronic equipment including any one of the above display drivers.

An embodiment of the invention provides electronic equipment including the above electro-optic device.

According to the above embodiments of the invention, there can be provided electronic equipment including a display driver that implements a gamma correction having low power consumption without increasing the size of the display driver to improve the image quality.

An embodiment of the invention provides a gamma correction method for a display driver which drives a plurality of data lines of an electro-optical device, comprising:

converting ki-bit ($1 \leq i \leq p$, k1 to kp are integers) gray-scale data to converted gray-scale data of j (j>ki, j is an integer equal to or more than two) bits for each of first to p-th (p is an integer equal to or more than two) color components constituting one pixel;

selecting a reference voltage corresponding to the converted gray-scale data of each color component among reference voltages of $2^j$ types, and outputting the reference voltage as a data voltage;

driving first to p-th data lines based on a data voltage of each color component, wherein the converted gray-scale data is generated so as to select any one of the reference voltages of $2^j$ types to which a gray-scale value corresponding to ki bit gray-scale data is allocated and output the reference voltage as the data voltage.

This gamma correction method may include:

setting gray-scale indication information for indicating reference voltages of $2^{ki}$ types among the reference voltages of $2^j$ types; and deciding which of the reference voltages of $2^j$ types a reference voltage corresponding to the gray-scale data is based on the gray-scale indication information, and generating the converted gray-scale data based on a decision result.

In this gamma correction method, the gray-scale indication information may be $2^j$ bit information;

converted gray-scale number information of $2^{ki}$ types may be generated based on the gray-scale indication information; and the gray-scale data and the converted gray-scale number information may be compared by using the gray-scale data as a gray-scale number before conversion, and the converted gray-scale data may be generated based on a comparison result.

This gamma correction method may comprise:

dividing $2^j$ bits into a plurality of blocks to each of which block data is allocated, each block having a plurality of bits;

obtaining a matching block in which the gray-scale data matches the converted gray-scale number information and, a bit position which is indicated by the gray-scale indication information in the matching block and at which the gray-scale data matches the converted gray-scale number information; and generating the converted gray-scale data based on the block data allocated to the matching block and the bit data corresponding to the bit position.

Embodiments of the invention will now be described in detail with reference to the drawings. The embodiments described below do not unfairly limit the contents of the invention described within the scope of claims. All the structures described below are not necessarily essential components of the invention.

1. LCD Device

FIG. 1 is a view showing the outline of the structure of an active-matrix type LCD device in the present embodiment. Although FIG. 1 illustrates an active-matrix type LCD device, a passive-matrix type LCD device may be used.

An LCD device 10 includes an LCD panel (a display panel in the broad sense, an electro-optical device in the broader sense) 20. The LCD panel 20 is formed on, for example, the glass substrate. On the glass substrate, a plurality of scanning lines (gate lines) GL1 to GLM (M is an integer equal to or more than 2) are arranged in the Y direction, each scanning line extending in the X direction, and a plurality of data lines (source lines) DL1 to DLN (N is an integer equal to or more than 2) are arranged, each data line extending in the Y direction. A pixel region (pixel) is provided in correspondence to the intersection between the scanning line GLm ($1 \leq m \leq M$, m is an integer, the same hereinafter) and the DLn ($1 \leq n \leq M$, n is an integer, the same hereinafter), and a thin film transistor (hereinafter, refers to as TFT) 22mn is arranged in the pixel region.

The gate of the TFT 22mn is connected to the scanning line GLm. The source of the TFT 22mn is connected to the data line DLn. The drain of the TFT 22mn is connected to a pixel electrode 26mn. A liquid crystal (electro-optical substance in the broad sense) is sealed between the pixel electrode 26mn and a counter electrode 28mn on the opposite side, so that a liquid crystal capacitor (a liquid crystal element in the broad sense) 24mn is formed. The transmittance of the pixel changes in accordance with the voltage applied between the pixel electrode 26mn and the counter electrode 28mn. A counter electrode voltage Vcom is supplied to the counter electrode 28mn.

The LCD panel 20 as described above is formed, for example, by combining a first substrate having a pixel electrode and a TFT formed thereon and a second substrate having a counter electrode formed thereon and sealing a liquid crystal as an electro-optical substance between both substrates.

The LCD device 10 includes a data driver (a display driver in the broad sense) 30. The data driver 30 drives the data lines DL1 to DLN of the LCD panel 20 based on the gray-scale data.

The LCD device 10 may include a scan driver (a gate driver in the narrow sense, a display driver in the broad sense) 32. The scan driver 32 sequentially drives (scans) the scanning lines GL1 to GLM of the LCD panel 20 during single vertical scanning.

The LCD device 10 includes a power supply circuit 100. The power supply circuit 100 generates the voltage required for driving the data line and supplies it to the data driver 30. The power supply circuit 100 generates the power supply voltage VDDH and VSSH required for the driving the data line of the data driver 30 and the voltage of the logic part of the data driver 30. The power supply circuit 100 generates the voltage required for scanning the scanning line, and supplies it to the scan driver 32.

Furthermore, the power supply circuit 100 includes a counter electrode voltage supply circuit. The counter electrode voltage supply circuit generates the counter electrode voltage Vcom. Namely, the power supply circuit 100 outputs to a counter electrode of the LCD panel 20 a counter electrode voltage Vcom that periodically repeats to be a power supply voltage on the high potential side VCOMH and a power supply voltage on the low potential side VCOML in accordance with the timing of a polarity reversal signal POL generated by a data driver 30.

The LCD device 10 may include a display controller 38. The display controller 38 controls the data driver 30, the scan driver 32, and the power supply circuit 100 in accordance with the contents determined by the host such as a central processing unit (hereinafter, refers to as CPU) not shown. For example, the display controller 38 sets the operation mode, sets the polarity inversion driving, sets the polarity inversion timing, and supplies a vertical synchronizing signal and a horizontal synchronizing signal that are generated in the inside for the data driver 30 and the scan driver 32.

In the structure shown in FIG. 1, the power supply circuit 100 or the display controller 38 is included in the LCD device 10, but at least one of them may be disposed outside the LCD device 10. Alternatively, the LCD device 10 may include a host.

The data driver 30 may incorporate at least one of the scan driver 32 and the power supply circuit 100.

Figure 2:
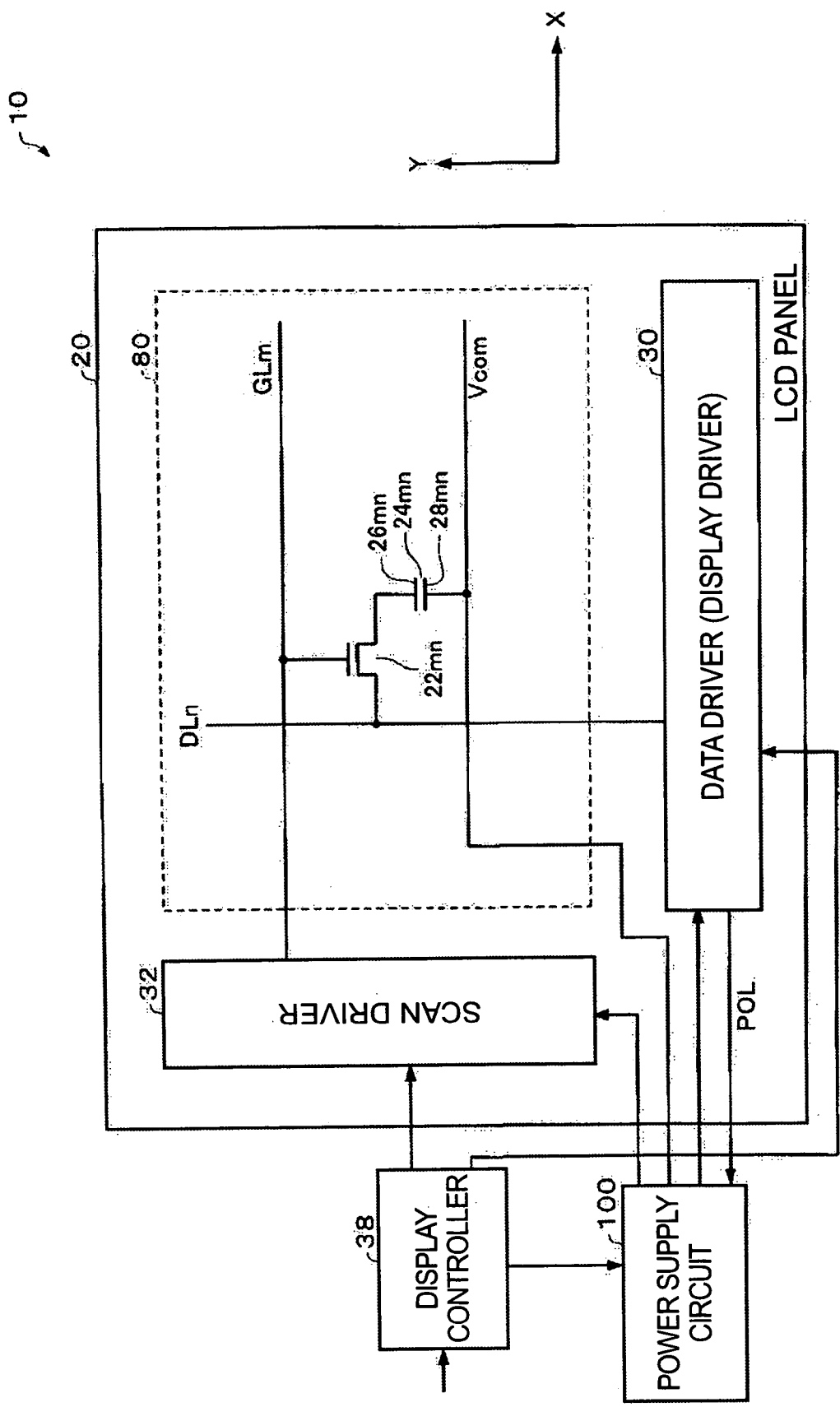
FIG. 2 is a view showing the outline of another structure of the LCD device including the electro-optical device in the present embodiment.

Furthermore, the data driver 30, the scan driver 32, the display controller 38 and the power supply circuit 100 may be partially or totally formed on the LCD panel 20. In FIG. 2, for example, the data driver 30 and the scan driver 32 are formed on the LCD panel 20. Thus, the LCD panel 20 may be structured so as to contain a plurality of scanning lines, a plurality of data lines, a pixel electrode specified by one of a plurality of scanning lines and one of a plurality of data lines, a scan driver for scanning a plurality of scanning lines, and a data driver for driving a plurality of data lines. A plurality of pixels is formed in a pixel formation region 80 of the LCD panel 20.

2. Scan Driver

Figure 3:
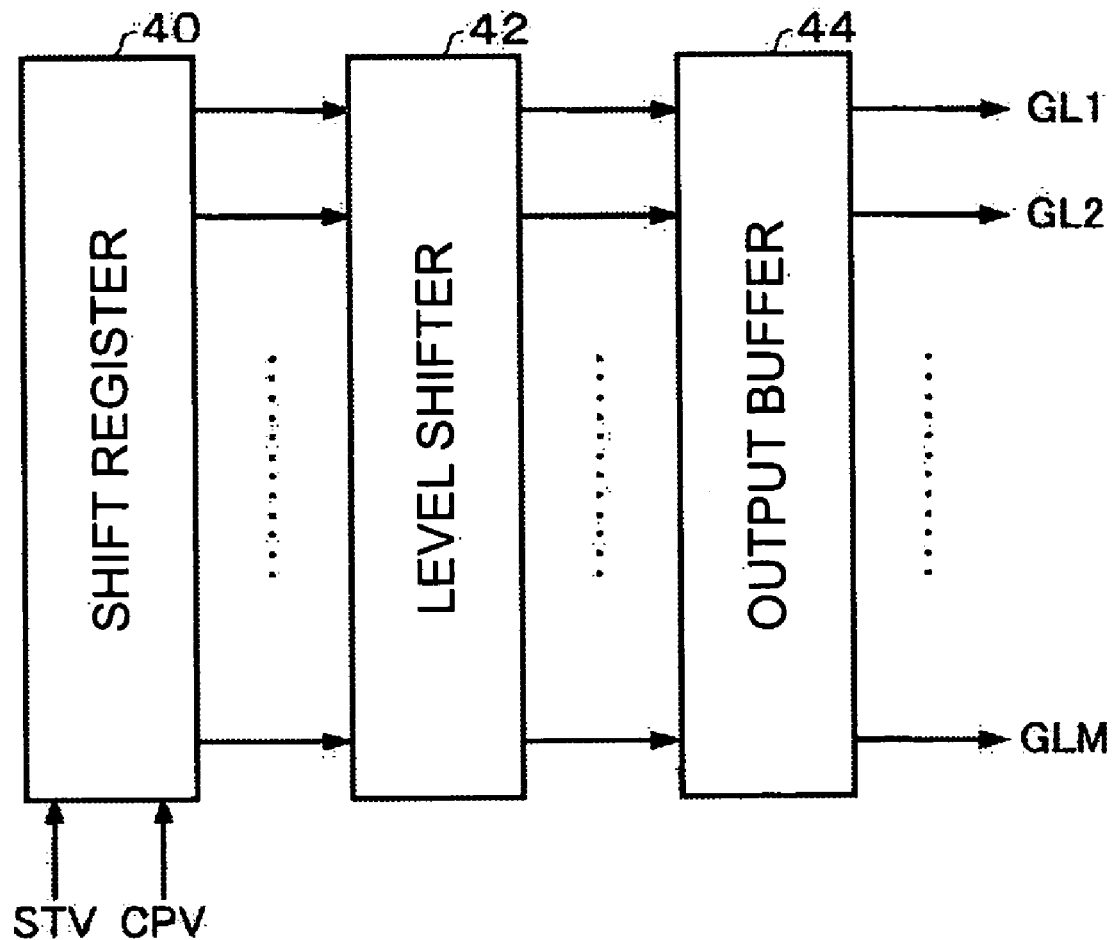
FIG. 3 is a block diagram of a structure example of the scan driver in FIG. 1.

FIG. 3 shows a structure example of the scan driver 32 in FIG. 1.

The scan driver 32 includes a shift register 40, a level shifter 42, and an output buffer 44.

The shift registers 40 are provided in accordance with scanning lines and contains a plurality of flip-flops that are connected in series with one another. This shift register 40 has a start pulse signal STV held to a flip-flop in synchronization with a clock signal CPV, and then successively shifts a start pulse signal STV to the adjacent flip-flop clock signal CPV. The clock signal CPV input at this point is a horizontal synchronizing signal; a start pulse signal STV is a vertical synchronizing signal.

The level shifter 42 shifts the voltage level from one of the shift register 40 to one in accordance with a liquid crystal element of the LCD panel 20 and the transistor performance of the TFT. A high voltage level, for example, of 20 V to 50 V is required as the voltage level.

The output buffer 44 buffers the scanning voltage shifted by the level shifter 42, and outputs it to the scanning line to drive the scanning line.

3. Data Driver

Figure 4:
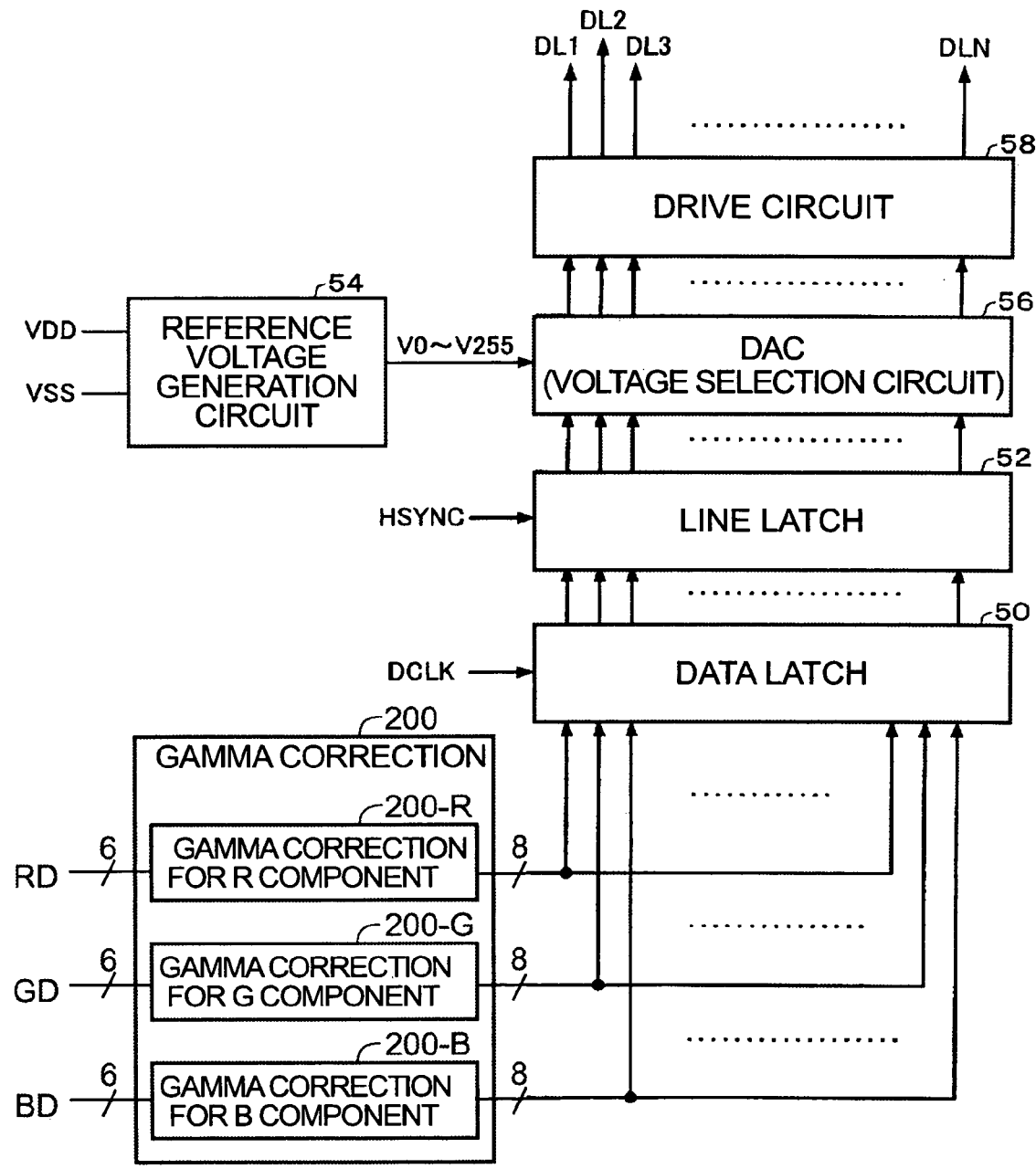
FIG. 4 is a block diagram of a structure example of the data driver in FIG. 1.

FIG. 4 shows a block diagram of a structure example of the data driver in FIG. 1. The case in which 1 pixel includes first to third components (=p) is shown in FIG. 4. Namely, the case in which 1 pixel includes R component (a first color component), G component (a second color component) and B component (a third color component) is shown. A block diagram of a structure example of the data driver 30 of FIG. 1 is shown in FIG. 4. The case in which 1 pixel includes first to third (=p) color components is shown in FIG. 4. Namely, the case in which 1 pixel includes the R component (a first color component), G component (a second color component), and B component (a third color component). The gray-scale data of each color component is 6 bits and is assigned to one of 256 (=$2^8$) gray scales, thereby achieving the gamma correction.

The data driver 30 includes a data latch 50, a line latch 52, a reference voltage generation circuit 54, a digital/analog converter (DAC) (a voltage selection circuit in the broad sense) 56, a driving circuit 58, and a gamma correction circuit 200.

The gray-scale data is input in serial by pixel (or 1 dot unit) to the data driver 30. This gray-scale data is input in synchronization with a dot clock signal DCLK. The dot clock signal DCLK is supplied from the display controller 38. The gray-scale data of each of R component, G component, and B component is 6 bits, and therefore the gray-scale data for 1 pixel is 18 bits.

In this embodiment, the gray-scale data of each color component input to the data driver 30 is supplied to the gamma correction circuit 200. The gamma correction circuit 200 includes the gamma correction circuit for first to p color components (p is an integer equal to or more than 2), each provided for each of color components constituting 1 pixel. FIG. 4 shows the case in which p is 3. Namely, the gamma correction circuit 200 includes a gamma correction circuit 200-R for the R component as a gamma correction circuit for a first color component, a gamma correction circuit 200-G for the G component as a gamma correction circuit for a second color component, and a gamma correction circuit 200-B for the B component as a gamma correction circuit for a third color component. A gamma correction circuit for the color component converts the 6 (=ki) bit gray-scale data to the 8 (=j) bit converted gray-scale data.

The number of bits of the gray-scale data for each color component has been described to be equally 6 bits in FIG. 4, but is not limited to this; the number of bits of the gray-scale data for each color component may differ from one another. It is, however, desirable that the number of bits of the gray-scale data for each color component be equally the same, which is greater than the number of bits of the gray-scale before conversion. Namely, the gamma correction circuit for the i-th ($1 \leq i \leq p$, i is an integer) color component converts ki (k1 to kp are integers) bit gray-scale data to j ($j \geq ki$, I is an integer equal to or more than 2) bit converted gray-scale data. Thus, by making the number of bits of the converted gray-scale data of each color component the same, the reference voltage of $2^j$ types generated by the reference voltage generation circuit 54 can be in common use with the first to p-th color components.

The converted gray-scale data that is converted by the gamma correction circuit 200-R for the R component, the gamma correction circuit 200-G for the G component, and the gamma correction circuit 200-B for the B component is supplied to the data latch 50.

The data latch 50 shifts taking-in start signal in synchronization with a dot clock signal DCLK and latches the converted gray-scale data for each color component in synchronization with the shift output, thereby taking in the converted gray-scale data of R component, G component, and B component for single horizontal scanning.

The line latch 52 latches the converted gray-scale data for single horizontal scanning latched by the data latch 50 with the change timing of a horizontal synchronizing signal HSYNC.

The reference voltage generation circuit 54 generates a plurality of reference voltages, each reference voltage corresponding to each converted gray-scale data. More specifically, the reference voltage generation circuit 54 generates a plurality of reference voltages V0 to V255, each reference voltage corresponding to each converted gray-scale data of 8 bits, based on the high potential side power supply voltage VDDH and the low potential side power supply voltage VSSH. In this embodiment, the reference voltages V0 to V255 are in common use for the R component, G component, and B component.

The DAC 56 generates the data voltage that corresponds to the converted gray-scale data output from the line latch 52 for each output line. More specifically, the DAC 56 selects the reference voltage corresponding to the converted gray-scale data, which is output from the line latch 52, for 1 output line, among a plurality of reference voltages V0 to V255 generated by the reference voltage generation circuit 54 for each color component, and outputs the selected reference voltage as the data voltage. Namely, the DAC 56 selects the reference voltage corresponding to the converted gray-scale data of each color component, for each color component, among reference voltages of $2^j$ types, and outputs it as the data voltage.

The driving circuit 58 drives a plurality of output lines, each output line being connected with each data line of the LCD panel 20. More specifically, the driving circuit 58 drives each output line based on the data voltage generated for each output line by the DAC 56. Namely, the driving circuit 58 drives the data line based on the data voltage using the reference voltage selected as the data voltage on the basis of the converted gray-scale data of each color component, for each color component. If 1 pixel includes first to p-th color components, the driving circuit 58 drives first to p-th data lines for each color component. The driving circuit 58 contains a voltage follower connected operational amplifier that is provided for each output line, and the operational amplifier drives each output line based on the data voltage form the DAC 56.

In the data driver 30 having such a structure, 6 bit gray-scale data of each color component is converted to 8 bit converted gray-scale data of each color component by means of the gamma correction circuit 200. Accordingly, 6 bit gray-scale data is allocated to any one of 8 bit converted gray-scale data. The converted gray-scale data is made to correspond to any one of reference voltages V0 to V255 that occur in the reference voltage generation circuit 54, resulting in the same effect as the gamma correction in accordance with the allocation method of 6 bit gray-scale data.

Then, after the converted gray-scale data of each color component is taken in the data latch 50, the converted gray-scale data for single horizontal scanning, for example, is latched to the line latch 52. The data voltage is generated for each output line by using the converted gray-scale data latched by the line latch 52. The driving circuit 58 drives each output line based on the data voltage generated by the DAC 56.

The gray-scale data input in serial is converted to the converted gray-scale data, and the converted gray scale data is taken in the data latch 50, as described above. In this case, there is no need for providing a gamma correction circuit for the first to p-th color components for each output line, in comparison with the case in which the gray-scale data is converted to the converted gray-scale data after being taken in the data latch 50 or the line latch 52. Therefore, the circuit area of the data driver 30 can be significantly reduced.

Figure 5:
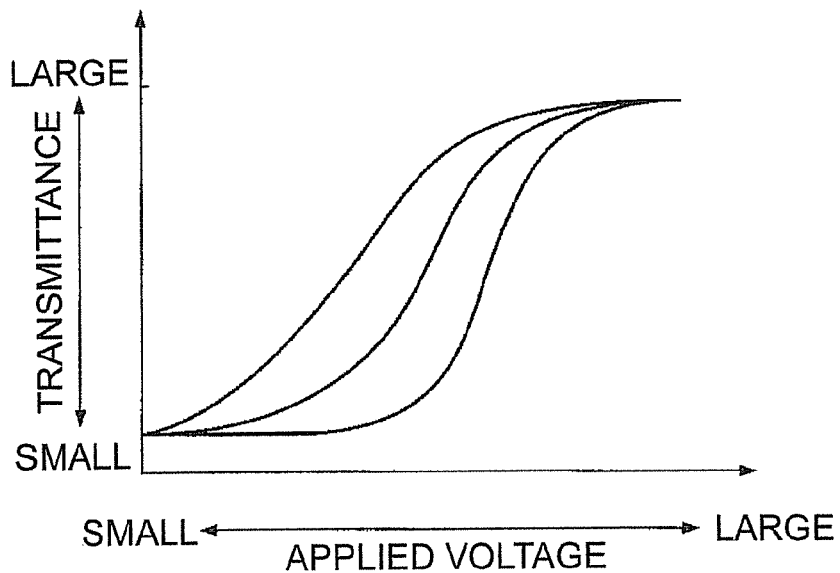
FIG. 5 is a view showing an example of display properties that differ depending on color components.

Additionally, the methods of allocating 6 bit gray-scale data for each color component can be changed. The different display properties of the LCD panel 20 for each color component as shown in FIG. 5 enables the display properties of each color component after gamma correction to be aligned or intentionally changed to a desired properties for each color component by using a common reference voltage (reference voltages V0 to V255 in FIG. 4). Regarding the display properties in FIG. 5, the change of transmittance of the liquid crystal (or the pixel) to the applied voltage of the liquid crystal is shown.

3.1 Gamma Correction Circuit

The structure of a gamma correction circuit will be specifically described below. Because the structures of gamma correction circuits for first to p-th color components can be the same, a gamma correction circuit 200-R for the R component in FIG. 4 will be taken as an example.

Figure 6:
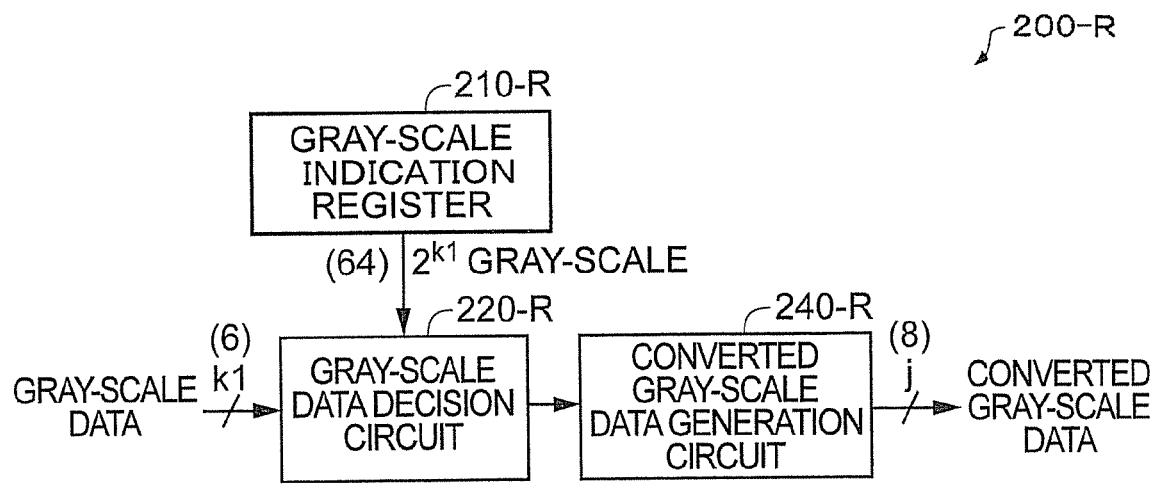
FIG. 6 is a block diagram of a structure example of the gamma correction circuit for the R component in FIG. 4.

A block diagram of a structure example of the gamma correction circuit 200-R for the R component of FIG. 4 is shown in FIG. 6.

The gamma correction circuit 200-R for the R component includes a gray-scale indication register 210-R, a gray-scale data decision circuit 220-R, and the converted gray-scale data generation circuit 240-R. The gamma correction circuit 200-R for the R component is structured to include the gray-scale indication register 210-R in FIG. 6, and the gray-scale indication register 210-R may be provided outside the gamma correction circuit 200-R for the R component.

The gray-scale indication information is set in the gray-scale indication register 210-R. The gray-scale indication information is the information to indicate voltages of $2^6$ (k1=6) types among voltages of $2^8$ (j=8) types. Such gray-scale indication information is set by the display controller 38 or a host. The gray-scale indication information set in the gray-scale indication register 210-R is supplied to the gray-scale data decision circuit 220-R.

The gray-scale data decision circuit 220-R decides on the basis of gray-scale indication information from a gray-scale indication register 210-R which voltage among voltages of $2^8$ types the reference voltage corresponding to 6 bit gray-scale data is. The converted gray-scale data generation circuit 240-R generates 8 bit converted gray-scale data based on the decision result of the gray-scale data decision circuit 220-R.

Namely, in the gamma correction circuit 200-R for the R component, the gray-scale value (gray-scale number) represented by the 6 bit gray-scale data is allocated to any one of 256 ($=2^8$) gray-scales represented by the 8 bit converted gray-scale data. Then, the gamma correction circuit 200-R for the R component receives 6 bit gray-scale data, and outputs the converted gray-scale data after allocation that corresponds to the gray-scale data. The data driver 30 can select any one of reference voltages V0 to V255 as the data voltage. Therefore, by changing the target among 256 gray-scales for allocation of the gray-scale value represented by 6 bit gray-scale data, the gamma correction can be achieved.

FIG. 7 is a view illustrating operations of the gamma correction circuit 200-R for the R component in FIG. 6;

Initially, grayscale values of 64 types represented by 6 bit grayscale data are allocated to any one of 256 grayscales represented by 8 bit converted grayscale data. The state in which each gray-scale value is allocated is indicated with the gray-scale indication information; allocation of gray-scale values is implemented by setting the gray-scale indication information to the gray-scale indication register 210-R.

In FIG. 7, for example, the gray-scale value 0 represented with 6 bit gray-scale data "000000" is allocated to the gray-scale value 0 of 256 gray-scales. Similarly, the gray-scale value 2 represented with 6 bit gray-scale data "000010", for example, is allocated to the gray-scale value 3 of 256 gray-scales. The gray-scale value 33 represented with 6 bit gray-scale data "100001" is allocated to the gray-scale value 124 of 256 gray-scales.

When the data driver 30 receives 6 bit gray-scale data for the R component from the display controller 38, for example, the gray-scale data decision circuit 220-R of the gamma correction circuit 200-R for the R component decides which gray-scale value of 256 gray-scales this gray-scale data for the R component has been allocated to. For example, when the gray-scale data for the R component is "100001", it is decided that the data is allocated to the gray-scale value 124 of 256 gray-scales.

Then, the converted gray-scale data generation circuit 240-R generates 8 bit converted gray-scale data based on the decision result of the gray-scale data decision circuit 220-R, which makes a decision as described above. For example, if the gray-scale data for the R component is "100001", when the gray-scale data decision circuit 220-R decides the gray-scale value 124 of 256 gray-scales, the converted gray-scale data generation circuit 240-R that receives the decision result generates "01111100" as the converted gray-scale data. Similarly, when the gray-scale data for the R component is "000010", the converted gray-scale data generation circuit 240-R generates "00000011" as the converted gray-scale data, and when the gray-scale data for the R component is "111111", the converted gray-scale data generation circuit 240-R generates "11111111" as the converted gray-scale data.

The converted gray-scale data thus generated is latched by the line latch 52 after being sequentially taken in the data latch 50 as shown in FIG. 4. In the DAC 56, the reference voltage corresponding to the converted gray-scale data is selected among the reference voltages V0 to V255 and output as the data voltage. The driving circuit 58 drives the data line based on the data voltage from the DAC 56. Thus, because the converted gray-scale data can be changed even for the same 6 bit gray-scale data based on the gray-scale indication information, the driving voltage of the data line can be changed. So-called gamma correction can thereby be attained without changing the voltage levels themselves of the reference voltages V0 to V255.

Then, an example of the circuit structure of the gamma correction circuit 200-R for the R component will be specifically described.

Figure 8:
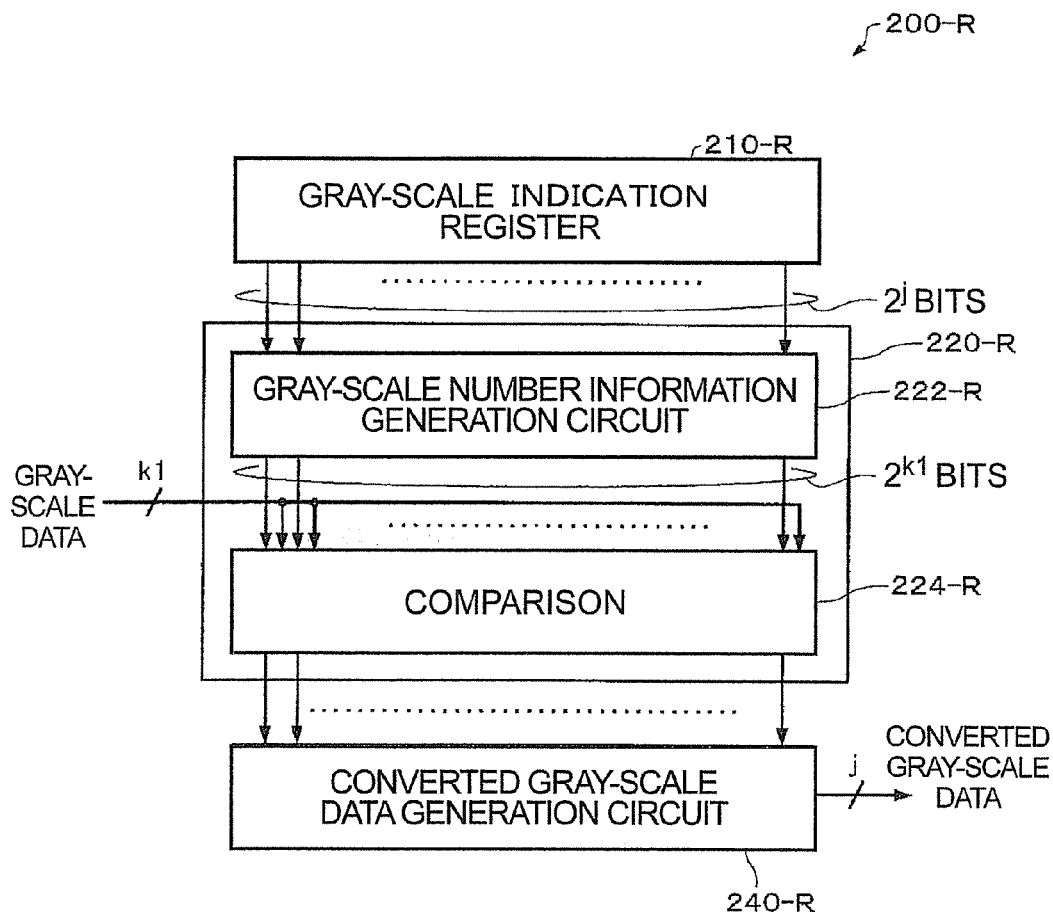
FIG. 8 is a block diagram of an example of the circuit configuration of the gamma correction circuit for the R component in FIG. 6.

A block diagram of the circuit structure of the gamma correction circuit 200-R for the R component of FIG. 6 is shown in FIG. 8.

In FIG. 8, however, blocks corresponding to the gamma correction circuit 200-R for the R component of FIG. 6 are indicated by the same reference numerals, and descriptions are suitably omitted.

The gray-scale indication register set in the gray-scale indication register 210-R is $2^j$ bits in FIG. 8. Accordingly, it is 256 bits if j is 8. The flag to indicate whether k1 (ki) bit gray-scale data is allocated is set in each bit for each gray-scale value of the $2^j$ gray-scale value.

Figure 9:
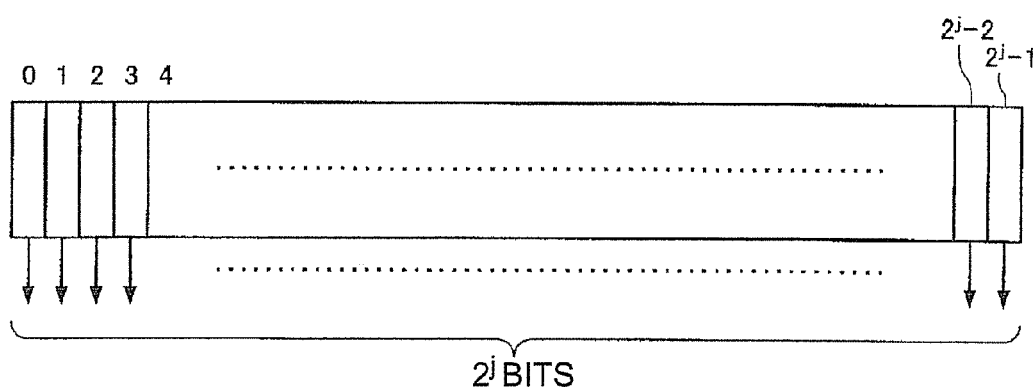
FIG. 9 is a view showing the structure of gray-scale indication information set in the gray-scale indication register in FIG. 8.

A structure example of the gray-scale indication information set in the gray-scale indication register 210-R of FIG. 8 is shown in FIG. 9. In FIG. 9, each bit is allocated to each gray-scale value of $2^j$ bit (gray-scale number). It is assumed that 1 is set for the bit to which the gray-scale value corresponding to 2 bit gray-scale data is allocated, and 0 is set for the bit to which the gray-scale value is not allocated.

If j is 8, k1 (that is, i=1) is 6, and the gray-scale value corresponding to 6 bit gray-scale data is allocated as shown in FIG. 7, a 0-th bit of the gray-scale indication information is set as "1", its first bit as "1", its second bit as "0", and its third bit as "1".

In FIG. 8, the gray-scale data decision circuit 220-R includes a gray-scale number information generation circuit 222-R and a comparison circuit 224-R.

The gray-scale number information generation circuit 222-R generates the converted gray-scale number information of $2^{k1}$ types based on the gray-scale indication information. If the number of bits of the gray-scale data for the i-th color component is ki, the gray-scale number information generation circuit generates the converted gray-scale number information of $2^{ki}$ types based on the gray-scale indication information.

The comparison circuit 224-R compares k1 bit (ki bit) gray-scale data as the gray-scale number before conversion with the converted gray-scale number information. Thus, it can be decided which voltage among voltages of $2^j$ types the reference voltage corresponding to the gray-scale value to which k1 bit gray-scale data is allocated among $2^j$ gray-scales. With this comparison result of the comparison circuit 224-R as the decision result of the gray-scale data decision circuit 220-R, the converted gray-scale data generation circuit 240-R generates j bit converted gray-scale data.

The outline of operations of the circuit diagram of the structure example in FIG. 8 will now be described before structures of blocks in FIG. 8 as described above are described.

Figure 10:
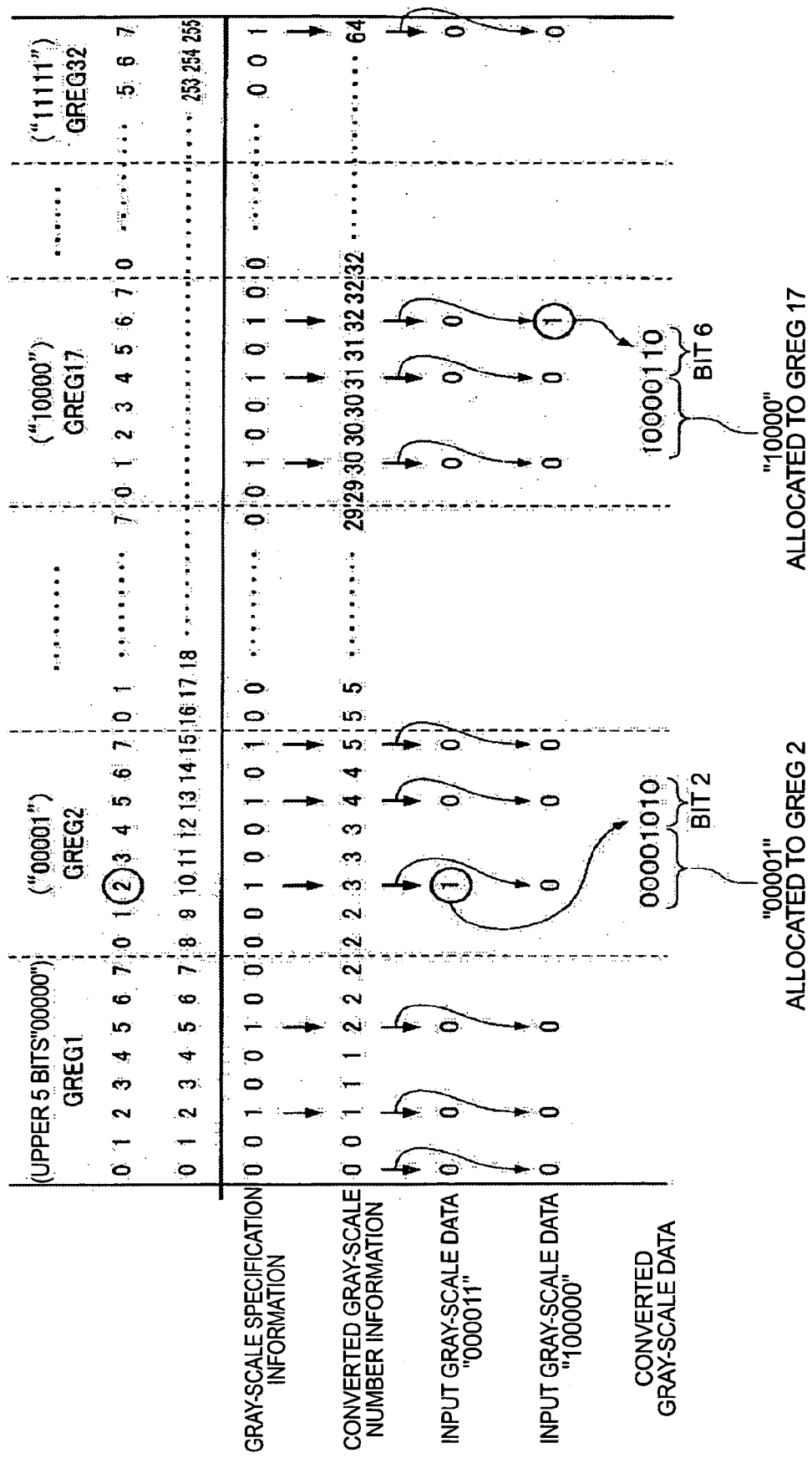
FIG. 10 is a view illustrating operations of the gamma correction circuit for the R component in FIG. 8.

An explanatory view of the outline of operations of the circuit structure example of the gamma correction circuit 200-R for the R component illustrated in FIG. 8 is shown in FIG. 10.

Initially, the gray-scale indication information is divided into a plurality of blocks. Then, whether the gray-scale number before conversion represented by k1 bit gray-scale data matches the converted gray-scale number information is decided by block. By using this decision result, the processing of generating the converted gray-scale data is performed by block.

For this purpose, unique block data is allocated to each block. In FIG. 10, $2^8$ bit gray-scale indication information is divided into 32 blocks by 8 bit, and 5 bit block data is allocated to each block. In FIG. 10, for example, block data "00000" is allocated to the block GREG1 to which 0-th to 7th bits of 256 bit gray-scale indication information belongs. In FIG. 10, the block data "00001" is allocated to a block GREG2 to which 8th to 15th bits of 256 bit gray-scale indication information belongs. Similarly, block data "11111" is allocated to a block GREG32 to which 248th to 255th bits of 256 bit gray-scale indication information belongs.

The gray-scale number information generation circuit 222-R generates the converted gray-scale number information based on the state of the flag set in each bit in the direction from 0th bit to 255th bit of the gray-scale indication information. More specifically, the gray-scale number information generation circuit 222-R detects whether the flag set in the bit is set to 1 in the direction from 0th bit to 255th bit of the gray-scale indication information. Under the condition in which the flag is set to 1, the count value set to be 0 in the 0th bit of the gray-scale indication information is counted up, and this count value is the converted gray-scale number information. In the example shown in FIG. 10, after being the count value that is 0 in the 0th bit of the gray-scale indication information is counted up to 1 in the 2nd bit, and then is further counted up to 2 in 5th bit. Such count up is performed up to 255th bit. If k is 6, the count value is 64 in the 255th bit.

Then, the comparison circuit 224-R obtains a block in which the gray-scale data that is the gray-scale number before conversion matches the converted gray-scale number information as the matching block. The comparison circuit 224-R obtains the bit position in which 1 is set (indicated) to the flag in the gray-scale indication information and the gray-scale data matches the converted gray-scale number information. In FIG. 10, if 6 bit gray-scale data "000011" is input, the comparison circuit 224-R obtains the block GREG2 as the matching block as well as a 2nd bit of the block GREG2 (10th bit of gray-scale indication information) as the bit position. The bit data is allocated to the bit position of each block.

Additionally, it is desirable in the gray-scale data decision circuit 220-R that the converted gray-scale number information be counted up after a comparison by the comparison circuit 224-R. Thus, a comparison with the converted gray-scale number information can be made accurately even when the gray-scale value represented by 6 bit gray-scale data is 0.

The converted gray-scale data generation circuit 240-R generates the converted gray-scale data based on the block data allocated to the matching block and the bit data corresponding to the bit position.

In FIG. 10, if 6 bit gray-scale data "000011" is input, the converted gray-scale data "00001010" is generated based on the block data "00001" of the block GREG2 and a bit data "010" (binary number representation of 2) corresponding to the 2nd bit of the block GREG2. Namely, the block data is set to the upper 5 bits of the converted gray-scale data, and the bit data is set to the lower 3 bits. Thus, the 8 bit converted gray-scale data is generated.

Similarly, with 6 bit gray-scale data "100000" taken as an example in FIG. 10, it is decided that the converted gray-scale number information of this gray-scale data matches 32. Therefore, the comparison circuit 224-R obtains the block GREG17 as the matching block and 6th bit as the bit position. The block data of the block GREG17 is "10000" and the bit data corresponding to the bit position is "110" (binary number representation of 6), and therefore 8 bit converted gray-scale data "10000110" is generated.

Figure 11:
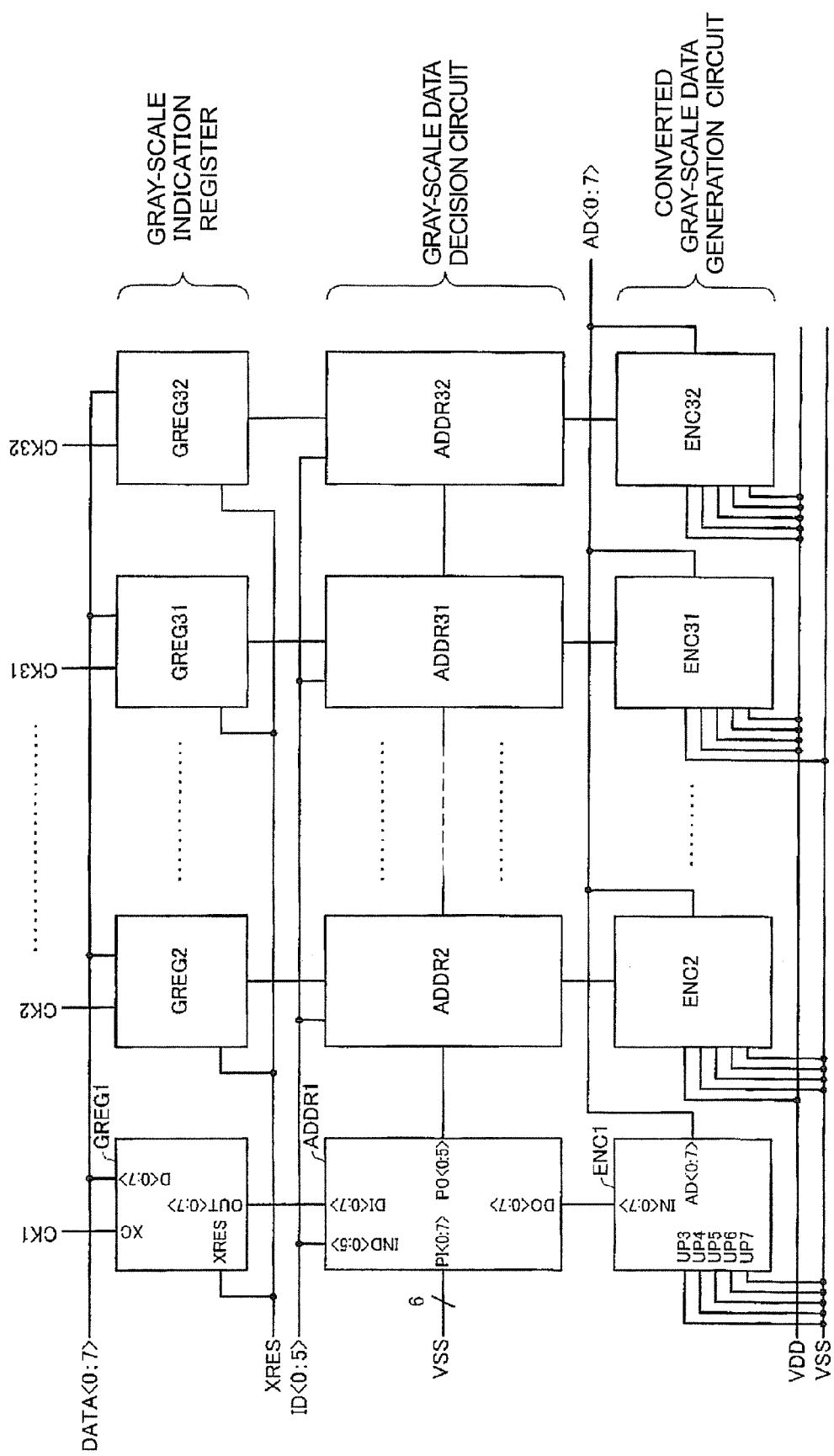
FIG. 11 is a block diagram of an example of the detailed circuit configuration of the gamma correction circuit for the R component in FIG. 8.

A block diagram of the detailed circuit structure example of the gamma correction circuit 200-R for the R component of FIG. 8 is shown in FIG. 11.

In FIG. 11, the gray-scale indication information is supplied to each block by 8 bits with DATA<0:7>. In the block GREGq (1≦q≦32, q is an integer), DATA<0:7> is taken at the point of variation of a write clock CKq. Blocks GREG1 to GREG32 have the same structure.

The 8 bit gray-scale indication information from the block GREGq is supplied to the block ADDRq structured by block as the gray-sacale data decision circuit 220-R. The 6 bit gray-scale data is input to this block ADDRq as ID<0:5>, and the decision result is output as DO<0:7>.

This DO<0:7> is input to the block ENCq structured by block as the converted gray-scale data generation circuit 240-R. The 5 bit block data is allocated to each of the blocks ENC1 to ENC32. Each block data consists of 5 bits from UP3 to UP7. The block ENCq outputs AD<0:7> as the converted gray-scale data.

Figure 12:
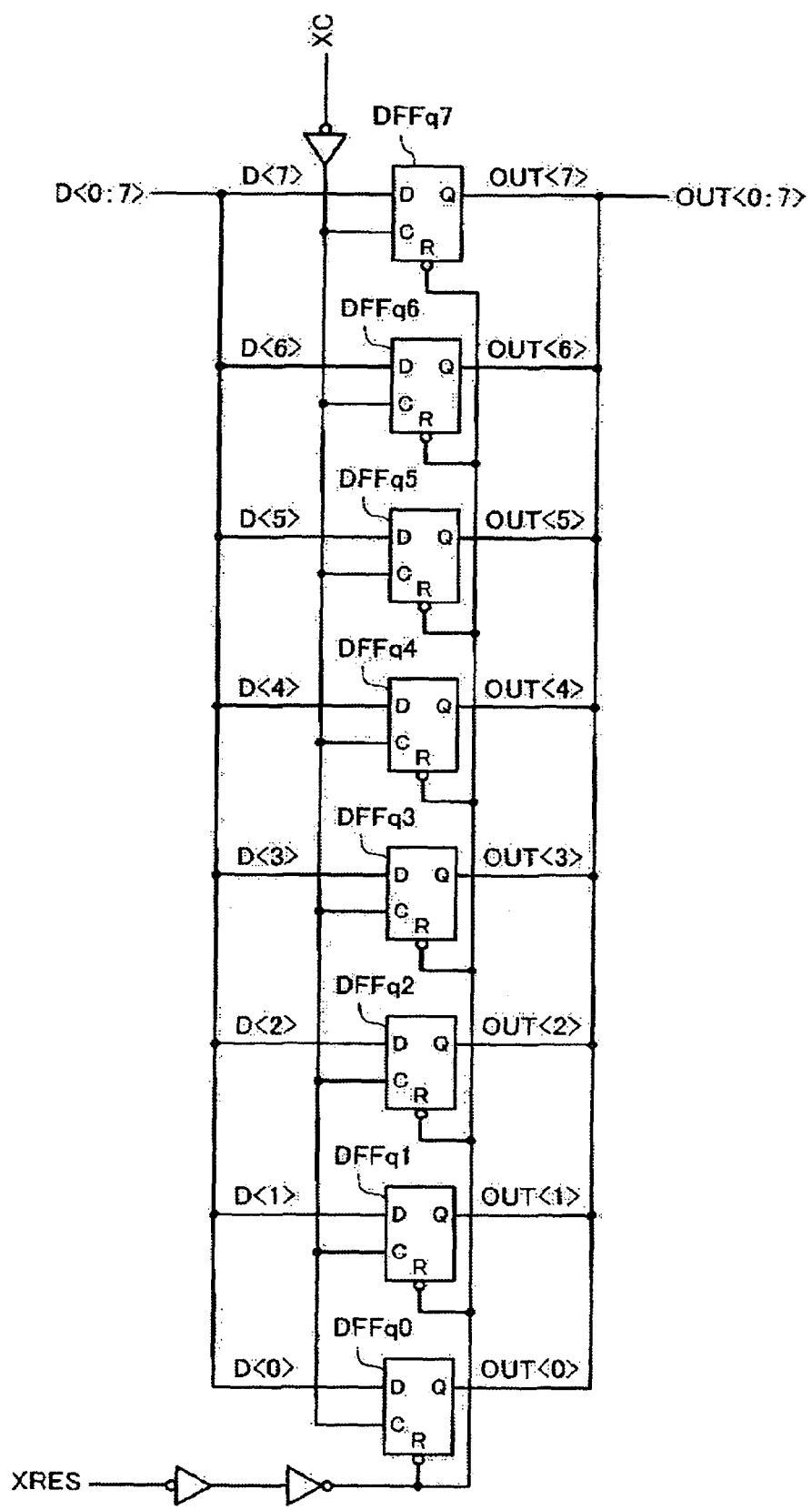
FIG. 12 is a circuit diagram of a structure example of the block GREGq in FIG. 11.

A circuit diagram of a structure example of the block GREGq in FIG. 11 is shown in FIG. 12.

The block GREGq has eight D type flip-flops (hereinafter, referred to as DFF) q0 to DFFq7. D<0:7> is commonly supplied to DFFq0 to DFFq7, and the data of each bit of the gray-scale indication information is taken into them based on the inversion signal of XC.

Figure 13:
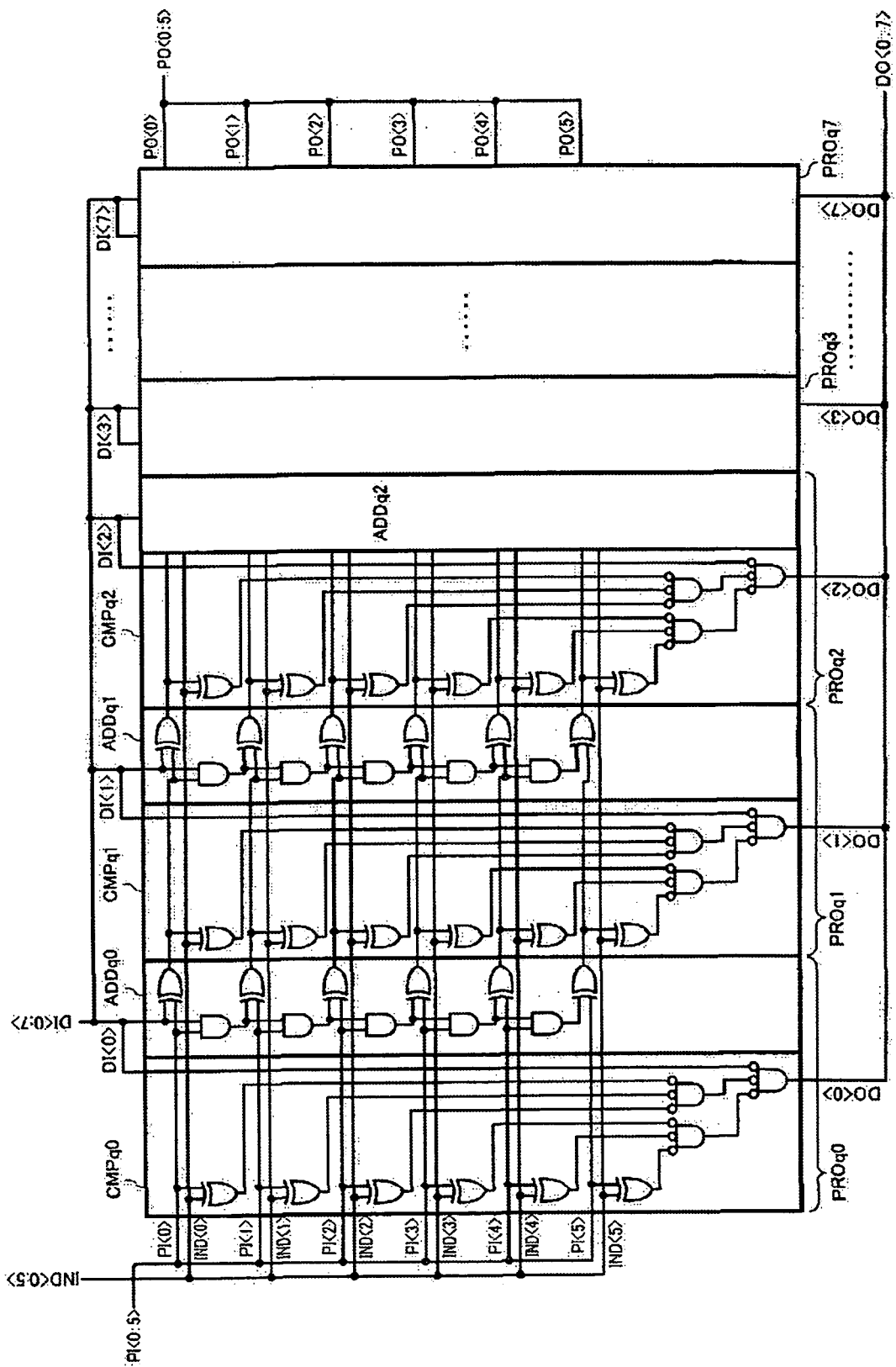
FIG. 13 is a circuit diagram of a structure example of the block ADDRq in FIG. 11.

A circuit diagram of a structure example of the block ADDRq in FIG. 11 is shown in FIG. 13.

The block ADDRq includes the comparison operation circuits PROq0 to PROq7 provided for bits of DI<0:7>. The comparison operation circuit PROqr (0≦r≦7, r is an integer) includes a comparison circuit CMPqr and an adding circuit ADDqr. Namely, the comparison operation circuit PROq0, for example, is provided in correspondence to DI<0>, and contains a comparison circuit CMPq0 and an adding circuit ADDq0. Similarly, the comparison operation circuit PROq7, for example, is provided in correspondence to DI<7>, and contains the comparison circuit CMPq7 and the adding circuit ADDq7.

IND<0:5> as a signal representing 6 bit gray-scale data is input to the comparison operation circuit PROq0. The PI<0:5> is a signal representing the converted gray-scale number information, and the value is output as it is or the value counted up is output for each comparison operation circuit in accordance with the data of each bit of DI<0:7> representing 8 bit gray-scale indication information among 256 bits. A signal representing that the converted gray-scale number information is 0 is input to PI<0:5> of the comparison operation circuit PROq0.

The comparison circuit CMPq0 compares PI<0:5> representing the converted gray-scale number information with IND<0:5> representing the gray-scale data, and outputs DO<0> that is at H level if the PI<0:5> matches the IND<0:5> and is at L level if the PI<0:5> does not match the IND<0:5>.

In the comparison circuit CMPq0, the mask control is implemented so as to make DO<0> to be at H level, provided that DI<0> is at H level if PI<0:5> matches IND<0:5>. This is for the purpose of preventing DO<0> from being at H level for the gray scales to which the 6 bit gray-scale data is not allocated among 256 gray scales, because PI<0:5> represents the converted gray-scale number information regardless the state of allocating 6 bit gray-scale data among 256 gray-scales. For example, in FIG. 10, PI<0:5> represents the converted gray-scale number information; the gray-scale indication information indicated with 10th to 12th bits among 256 bits indicates 3. At this point, a matching signal indicating that the gray-scale data matches the converted gray-scale number information can be at H level in the 10th bit for which the flag of the bit of the gray-scale indication information is set to 1, and the matching signal can be at L level in the 11th and 12th bits.

The adding circuit ADDq0 adds DI<0>, which is 1 bit data of the gray-scale indication information, to PI<0:5>, and the addition result is supplied as PI<0:5> of the comparison operation circuit PROq1.

Similarly, the comparison operation circuit PROq1 also compares PI<0:5> from the adding circuit ADDq0 with gray-scale data IND<0:5> in the comparison circuit CMPq1, and the comparison result is output as DO<1>. Then, in the adding circuit ADDq1, PI<0:5> is added to DI<1>, and the addition result is supplied as PI<0:5> of the comparison operation circuit PROq2.

Thus, DO<0:7> output for each comparison operation circuit is supplied to the block ENCq. Then, the addition result of the adding circuit ADDq7 of the comparison operation circuit PROq7 is supplied as PO<0:5> to a comparison circuit CMP (q+1) 0 and an adding circuit (q+1) 0 of the comparison operation circuit PRO (q+1) 0 of the next block ADDR (q+1).

Figure 14:
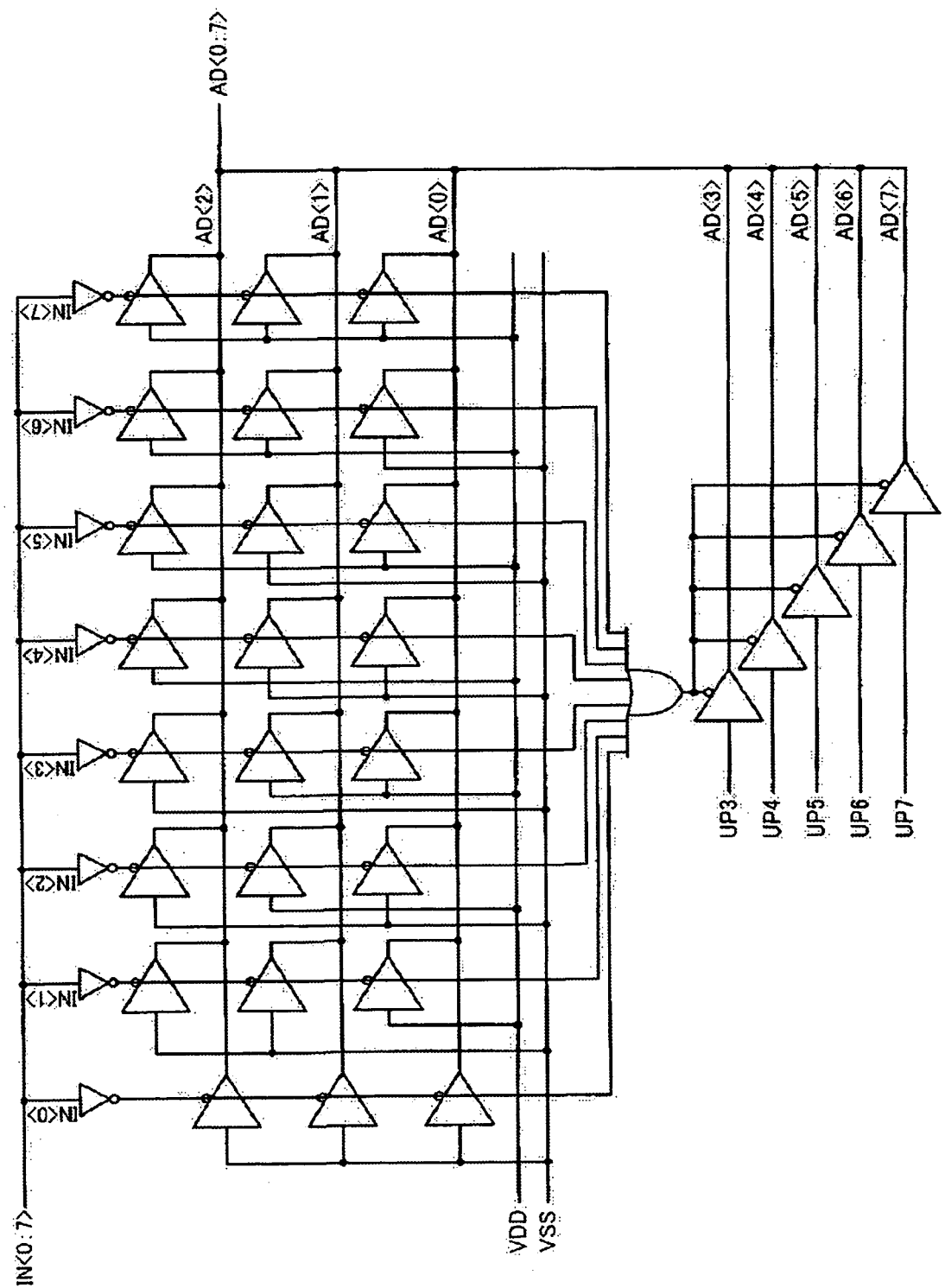
FIG. 14 is a circuit diagram of a structure example of the block ENCq in FIG. 11.

A circuit diagram of a structure example of the block ENCq in FIG. 11 is shown in FIG. 14.

DO<0:7> from the block ADDRq is input as IN<0:7> into the block ENCq. The block ENCq encodes IN<0:7> by 3 bit AD<0:2>. Thus, the bit data corresponding to the bit position of each block can be output.

The block ENCq also decides whether any one of each bit among IN<0:7> is at H level. Thus, whether the block is the matching block where the gray-scale data that is the gray-scale number before conversion matches the converted gray-scale number information can be decided. Namely, with the result of logical OR operation of IN<0:7> by bit, outputs of UP3 to UP7 are controlled. The UP3 to UP7 are the data inherent in the block ENCq as the block data.

In the structure as described above, if all the IN<0:7> is at L level, the block ENCq makes AD<0:2> in a state of high impedance and also sets AD<3:7> in the sate of high impedance.

On the other hand, if any one of bits of IN<0:7> is at H level, the encoded result is output to AD<0:2>. For example, if IN<3> is at H level, "100" is output as AD<0:2>. Then, the block data of the block ENCq is output as AD<3:7>. In the case of the block ENC10, "01001" is output as AD<3:7>.

Thus, the block ENCq bit-connects AD<0:2> with AD<3:7> and outputs AD<0:7> as 8 bit converted gray-scale data.

Description has been given for the R component alone in FIGS. 6 to 14, and it should be understood that the similar description may be given for at least one of the G component and the B component.

If the circuit to simply convert 6 bit gray-scale data to 8 bit converted gray-scale data is realized, realizing this circuit by using so-called read only memory (ROM) circuit is possible. If the ROM circuit is employed, however, the circuit is in large scale, and the tip area of the data driver to which the ROM circuit is incorporated is enlarged, leading to high cost.

Figures 15, 16:
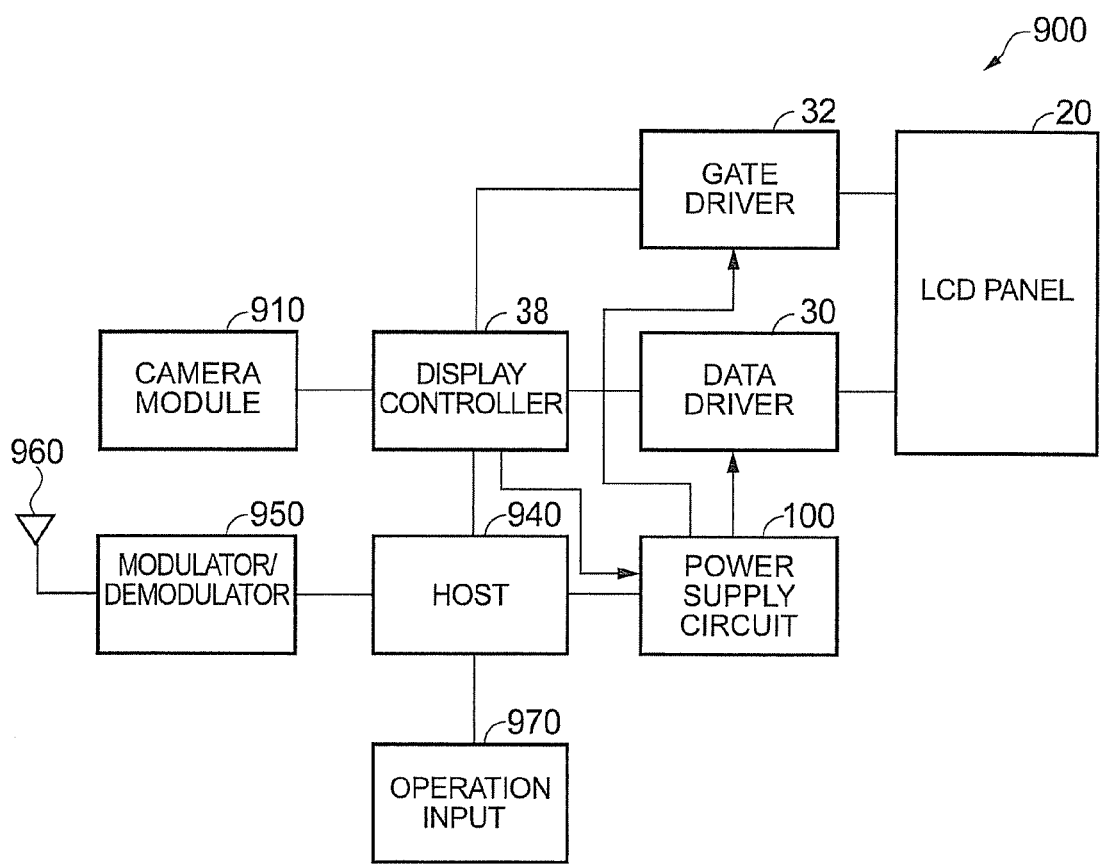
FIG. 15 is a view for illustrating the effect of the present embodiment.
FIG. 16 is a block diagram of a structure example of the electronic equipment of the present embodiment.

Comparison examples on the circuit size between in the case of ROM circuit and the case of this embodiment are shown in FIG. 15. In this table, the comparison examples of converting 6 bit gray-scale data to 8 bit converted gray-scale data are shown, if the circuit is manufactured by 0.25 μm process as a general manufacture process.

In this case, the size per 1 cell of the ROM is 15 μm$^2$. Accordingly, 64 (address)×15 (μm$^2$/cell)×8 (cell)=7680 μm$^2$ per color component is required as the cell area. Further, the address decoder to decode this address is required, and therefore around 9000 μm$^2$ in total becomes required. If the ROMs described above are provided for all components, that is, the R component, G component, and B component, an around 27000 μm$^2$ cell area is required.

On the other hand, if the principle of this embodiment is adopted and the circuit structure illustrated in FIGS. 11 to 14 of this embodiment is implemented by the 0.25 μm process, it has become clear that a width of around 300 μm and a length of around 15 μm are sufficient for each color component. Namely, around 4500 μm$^2$ is sufficient for every color component. Accordingly, if the circuit is provided for every color component, that is, the R component, G component, and B component, a switching circuit for switching the gray-scale data that is supplied for color components enlarges only 5 μm per color, resulting in the cell area of 7500 μm$^2$. If the circuit is provided separately for each color component, its size can be further reduced.

As described above, in the circuit realized in this embodiment, the size can be reduced to around half for one color component and to around 1/3.6 for three color components in comparison with that in the ROM circuit. Additionally, if the ROM circuit is realized, the size per cell can be reduced by using the special manufacture process for the ROM circuit but leads to an increase in manufacturing cost.

4. Electronic Equipment

A block diagram of a structure example of the electronic equipment in this embodiment is shown in FIG. 16. In this case, a cellular phone is used as the electronic equipment. In FIG. 16, the same elements as in FIGS. 1 and 2 are indicated by the same reference numerals, and descriptions are suitably omitted.

A cellular phone 900 includes a camera module 910. The camera module 910 includes a CCD camera and supplies image data taken with the CCD camera to a display controller 38 in YUV format.

The cellular phone 900 contains an LCD panel 20. The LCD panel 20 is driven by the data driver 30 and the scan driver 32. The LCD panel 20 contains a plurality of gate lines, a plurality of source lines, and a plurality of pixels.

The display controller 38 is connected to the data driver 30 and the scan driver 32, and supplies the display data in RGB format to the data driver 30.

The power supply circuit 100 is connected to the data driver 30 and the scan driver 32, and supplies power supply voltages for driving to drivers. The counter electrode voltage Vcom is supplied to a counter electrode of the LCD panel 20.

A host 940 is connected to the display controller 38. The host 940 controls the display controller 38. After demodulating the display data received through an antenna 960 by a modulator/demodulator section 950, the host 940 can indicate sending the data to another communication device through the antenna 960. The display controller 38 has the data driver 30 and the scan driver 32 display the image on the LCD panel 20 based on the display data.

After modulating the display data generated with the camera module 910 by the modulator/demodulator section 950, the host 940 can indicate sending the data to another communication device.

The host 940 performs sending and receiving the display data, imaging of the camera module 910, and displaying of the LCD panel 20 based on the operation information from an operation input section 970.

The invention is not limited to the embodiment described above, and various modifications may be made within the gist of the invention. For example, the invention is not limited to an embodiment applied to the driving of the LCD panel described above; the invention may be applied to the driving of an electroluminescent device and a plasma display device.

Part of requirements of any claim of the present invention could be omitted from a dependent claim which depends on that claim. Moreover, part of requirements of any independent claim of the present invention could be made to depend on any other independent claim.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A display driver, comprising:
gamma correction circuits for first to p-th color components provided for first to p-th (p is an integer equal to or more than two) color components, a gamma correction circuit for an i-th ($1 \leq i \leq p$, i is an integer) color component converting ki bits (k1 to kp are integers) gray-scale data to converted gray-scale data of j (j >ki, j is an integer equal to or more than two) bits;

a voltage selection circuit that selects a reference voltage corresponding to the converted gray-scale data of each color component among reference voltages of $2^j$ types and outputs the reference voltage as a data voltage for each color component; and a driving circuit that drives an electro-optical based on a data voltage of each color component for each color component;

the gamma correction circuit for an i-th color component generating converted gray-scale number information of $2^{ki}$ types based on gray-scale indication information to indicate reference voltages of $2^i$ types among the reference voltages of $2^j$ types is set, the gray-scale indication information being $2^j$ bit information, $2^j$ bits being divided into a plurality of blocks to each of which block data is allocated, each block having a plurality of bits, the gamma correction circuit for an i-th color component a matching block at which the gray-scale data matches the converted gray-scale number information, and a bit position that is indicated by the gray-scale indication information in the matching block and at which the gray-scale data matches the converted gray-scale number information, and the gamma correction circuit for an i-th color component generating the converted gray-scale data based on block data allocated to the matching block and bit data corresponding to the bit position.

2. The display driver as defined by claim 1, further comprising:

a line latch that latches the converted gray-scale data of j bits for each color component, the converted gray-scale data being converted by the gamma correction circuits for first to p-th color components, the voltage selection circuit outputting the data voltage by using the converted gray-scale data latched by the line latch.

3. The display driver as defined by claim 1, the gamma correction circuit for the i-th color component comprising:

a gray-scale indication register to which the gray-scale indication information is set, a gray-scale data decision circuit that decides which of the reference voltages of $2^j$ types a reference voltage corresponding to the gray-scale data is, based on the gray-scale indication information, and a converted gray-scale data generation circuit that generates the converted gray-scale data based on a decision result of the gray-scale data decision circuit.

4. The display driver as defined by claim 3, the gray-scale data decision circuit comprising:

a gray-scale number information generation circuit that generates the converted gray-scale number information, and a comparison circuit that compares the gray-scale data as a gray-scale number before conversion with the converted gray-scale number information, and the converted gray-scale data generation circuit generating the converted gray-scale data, with a comparison result of the comparison circuit as a decision result of the gray-scale data decision circuit.

5. The display driver as defined by claim 4 the gray-scale data decision circuit obtaining the matching block and the bit position.

6. An electro-optical device, comprising:

a plurality of scanning lines;

a plurality of data lines;

a pixel electrode specified with one of the plurality of scanning lines and one of the plurality of data lines;

a scan driver that scans the plurality of scanning lines; and the display driver defined by claim 1 that drives the plurality of data lines.

7. Electronic equipment comprising the display driver as defined by claim 1.

8. Electronic equipment comprising the electro-optical device as defined by claim 6.

9. A gamma correction method for a display driver, comprising:

converting ki bits ($1 \leq i \leq p$, k1 to kp are integers) gray-scale data to converted gray-scale data of j (j >ki, is an integer equal to or more than two) bits for each of first to p-th (p is an integer equal to or more than two) color components;

selecting a reference voltage corresponding to the converted gray-scale data of each color component among reference voltages of $2^j$ types, and outputting the reference voltage as a data voltage;

driving an electro-optical device first to p-th data lines based on a data voltage of each color component;

setting gray-scale indication information for indicating reference voltages of $2^{ki}$ types among the reference voltages of $2^j$ types, the gray-scale indication information being 2 bit information;

generating converted gray-scale number information of $2^{ki}$ types based on the gray-scale indication information;

dividing $2^j$ bits into a plurality of blocks to each of which block data is allocated, each block having a plurality of bits;

obtaining a matching block at which the gray-scale data matches the converted gray-scale number in formation and, a bit position that is indicated by the gray-scale indication information in the matching block; and generating the converted gray-scale data based on the block data allocated to the matching block and the bit data corresponding to the bit position.

10. The gamma correction method as defined by claim 9, further comprising:

deciding which of the reference voltages of $2^j$ types a reference voltage corresponding to the gray-scale data is based on the gray-scale indication information, and generating the converted gray-scale data based on a decision result.

11. The gamma correction method as defined by claim 10:

the gray-scale data and the converted gray-scale number information being compared by using the gray-scale data as a gray-scale number before conversion, and the converted gray-scale data being generated based on a comparison result.

* * * * *